United States Patent
Le Gall et al.

(10) Patent No.: US 11,326,927 B2
(45) Date of Patent: May 10, 2022

(54) OPTICAL PROBE FOR MEASURING THE LEVEL OF A LIQUID IN A TANK

(71) Applicant: SAFRAN ELECTRICAL & POWER, Blagnac (FR)

(72) Inventors: Sebastien Le Gall, Blagnac (FR); David Thomasse, Blagnac (FR); Frederic Colin, Plaisance du Touch (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 398 days.

(21) Appl. No.: 16/484,395

(22) PCT Filed: Feb. 8, 2018

(86) PCT No.: PCT/FR2018/050308
§ 371 (c)(1),
(2) Date: Aug. 7, 2019

(87) PCT Pub. No.: WO2018/146423
PCT Pub. Date: Aug. 16, 2018

(65) Prior Publication Data
US 2020/0003604 A1    Jan. 2, 2020

(30) Foreign Application Priority Data
Feb. 10, 2017   (FR) ...................................... 1751126

(51) Int. Cl.
*G01F 23/292*   (2006.01)
*G01D 5/353*    (2006.01)

(52) U.S. Cl.
CPC ......... *G01F 23/292* (2013.01); *G01D 5/3537* (2013.01)

(58) Field of Classification Search
CPC ............................ G01F 23/292; G01D 5/3537
See application file for complete search history.

(56) References Cited

U.S. PATENT DOCUMENTS 3,120,125 A * 2/1964 Vasel .................. G01F 23/2927
73/293
4,644,177 A * 2/1987 Barabino ............. G01F 23/292
250/577
(Continued)

FOREIGN PATENT DOCUMENTS

EP    0 003 566 A1    8/1979
EP    3 112 822 A1    1/2017
(Continued)

OTHER PUBLICATIONS

International Search Report dated Jun. 18, 2018 in PCT/FR2018/050308 filed Feb. 8, 2017.
(Continued)

*Primary Examiner* — John Fitzgerald
(74) *Attorney, Agent, or Firm* — Oblon, McClelland, Maier & Neustadt, L.L.P.

(57) ABSTRACT

An optical probe that measures the level of a liquid in a tank includes a transparent and refracting optical waveguide for receiving an injection of a collimated light beam. The optical waveguide internally reflects the collimated light beam according to a total reflection regime in any part of the optical waveguide located in a gaseous medium and refracts the collimated light beam according to a refraction regime in any part of the optical waveguide immersed in a liquid medium. The optical waveguide switches from the total reflection regime to the refraction regime at the interface between the gaseous medium and the liquid medium, and mirrors are arranged around said optical waveguide and reverse the path of a light beam collimated and refracted by the optical waveguide, the optical path covered by the collimated light beam representing the level of the liquid in the tank.

9 Claims, 5 Drawing Sheets

(56) References Cited

U.S. PATENT DOCUMENTS

| | | | | |
|---|---|---|---|---|
| 4,870,292 A | * | 9/1989 | Alpert | G01F 23/2925 |
| | | | | 250/577 |
| 4,880,971 A | * | 11/1989 | Danisch | G01F 23/292 |
| | | | | 340/619 |
| 4,936,681 A | * | 6/1990 | Ruhrmann | G01D 5/268 |
| | | | | 250/227.25 |
| 5,164,608 A | * | 11/1992 | Vali | G01F 23/292 |
| | | | | 250/227.23 |
| 6,172,377 B1 | * | 1/2001 | Weiss | G01F 23/292 |
| | | | | 250/227.14 |
| 6,173,609 B1 | * | 1/2001 | Modlin | G01F 23/2922 |
| | | | | 250/577 |
| 6,693,285 B1 | | 2/2004 | Weiss | |
| 8,362,436 B1 | | 1/2013 | Mentzer et al. | |
| 8,695,420 B1 | | 4/2014 | Korman et al. | |
| 8,994,812 B2 | * | 3/2015 | Giordano | G01F 23/292 |
| | | | | 348/81 |
| 2003/0155538 A1 | | 8/2003 | Siepmann | |
| 2017/0003157 A1 | | 1/2017 | Cipullo et al. | |

FOREIGN PATENT DOCUMENTS

| | | |
|---|---|---|
| JP | 2005-127914 A | 5/2005 |
| WO | WO 01/09570 A1 | 2/2001 |

OTHER PUBLICATIONS

French Preliminary Search Report dated Nov. 21, 2017 in French Application 1751126 filed on Feb. 10, 2017.

\* cited by examiner

OPTICAL PROBE FOR MEASURING THE LEVEL OF A LIQUID IN A TANK

TECHNICAL FIELD

The present invention relates to the field of liquid level measurement in a tank, and, more particularly, the measurement of the fuel level in an aircraft tank.

PRIOR ART

Currently, in the aviation sector, capacitive effect electrical probes are used to measure the level of kerosene in a tank.

The capacitive probes are tubular devices, of various lengths, mounted vertically in the tank. Each capacitive probe is an electrically powered hollow tube, the capacitive value of which varies depending on the level of kerosene in the tube. The capacitive probes require electrical supply cables or harnesses as well as return cables for reporting the measurement to the computer in question. These cables are routed and connected to the various probes according to very rigorous safety standards. These safety standards are very effective but very constraining and rather complex from a technical point of view. In addition, the electrical harnesses are frequently subject to induced electrical noise phenomena. Furthermore, the system of capacitive probes comprises a lot of equipment which requires the management of a not insignificant number of references P/N (Part Number).

Other types of technology exist for measuring the level of a liquid in a tank. For example, document JP2005127914 discloses a detection device based on measuring the reduction in the intensity of light transmitted in an optical fibre having no sheath.

However, the measurement is very approximate, performed according to a reference table. In addition, the measurement is dependent on the light source which must have a constant light intensity over time, which is very difficult to ensure. Indeed, the intensity of the light source can fluctuate and, in particular, continuously decrease over time. Another disadvantage is the fragility of the optical fibre having no outer sheath in a liquid environment such as kerosene.

Hence, the aim of the present invention is to provide a passive optical probe, overcoming the above-mentioned disadvantages, enabling complete safety while escaping the very rigorous safety standards of capacitive probes and while being accurate and robust.

DISCLOSURE OF THE INVENTION

The invention relates to an optical probe suitable for measuring the level of a liquid in a tank, comprising:
- a refracting optical waveguide suitable for receiving an injection of a collimated light beam, said optical waveguide being configured to internally reflect the collimated light beam according to a total reflection regime in any part of the waveguide located in a gaseous medium and to refract the collimated light beam according to a refraction regime in any part of the optical waveguide immersed in a liquid medium, said waveguide being capable of switching from the total reflection regime to the refraction regime at the interface between the gaseous medium and the liquid medium once it is immersed, and
- mirrors arranged around said optical waveguide and suitable for reflecting the collimated light beam refracted by the waveguide in order to reverse its path at the interface between the gaseous medium and the liquid medium, the optical path travelled by the collimated light beam representing the level of the liquid in the tank.

The optical probe is entirely passive and completely removes any problem of routing electrical supply cables. In addition, it is very robust while giving very accurate measurements. Moreover, the optical probe minimises the number of pieces of equipment, thus limiting the number of references P/N.

According to a special feature of the present invention, the optical probe comprises a telemetry tool capable of injecting a light beam in the form of a very short light pulse into said optical waveguide and of receiving, in return, the reversed light beam enabling it to measure the time elapsed and consequently the length of the optical path travelled by the light beam and to deduce therefrom the level of liquid in the tank.

The telemetry tool is very accurate and only one optical fibre is required in order to connect it to the optical waveguide, since the optical fibre is used for conveying the light beam and for returning the reversed light beam to the telemetry tool.

Advantageously, the optical waveguide is a solid optical cylinder made of transparent and refractive material, said optical cylinder comprises a receiving region suitable for receiving the injection of the collimated light beam at a predetermined angle of incidence, said angle of incidence being configured so that, in the total reflection regime, the collimated light beam can travel a path consisting of a series of straight segments, the ends of which are points of impact of the light beam on the walls of the optical cylinder at said predetermined angle of incidence, said mirrors are attached to the cylinder and are arranged facing the points of impact, termed "windows".

The solid optical cylinder is very robust and makes it possible to have a very accurate measurement by enabling the collimated light to travel a quasi-helical path having a very small pitch. In addition, the receiving region makes it possible to lock the predetermined angle of incidence which is optimally selected enabling effective and invariably accurate switching, over time.

Advantageously, the optical waveguide is a right circular optical cylinder.

Alternatively, the optical waveguide is an optical right cylinder with prismatic surface.

According to a preferred embodiment of the present invention, the optical cylinder is formed of a set of cylindrical modular elements which are configured to be stacked firmly on one another.

This makes it possible to adapt the optical probe to any type of tank and to limit the number of references to just one.

Advantageously, each modular element comprises a mirror and male and female snap-fastening means suitable for ensuring snap-fastening in various configurations.

Advantageously, the value of the angle of incidence is determined according to the refractive indices of said optical cylinder, said gaseous medium and said liquid medium.

According to a particular embodiment of the present invention, the optical cylinder has a refractive index of approximately 1.5, the gaseous medium is air with refractive index of approximately 1, the liquid medium is kerosene with refractive index of approximately 1.44 and the value of the angle of incidence is approximately 60°.

Advantageously, said optical waveguide is suitable for receiving a plurality of collimated light beam injections.

This advantageously allows the accuracy of the measurements to be increased.

BRIEF DESCRIPTION OF THE FIGURES

Other features and advantages of the invention will become apparent on reading the preferred embodiments of the invention with reference to the attached figures, among which.

DETAILED DISCLOSURE OF THE SPECIAL EMBODIMENTS

The principle underlying the invention is that of correlating the time-of-flight of a light pulse with the length of the optical path travelled by said light pulse and then with the height of a liquid in a tank.

Figure 1:
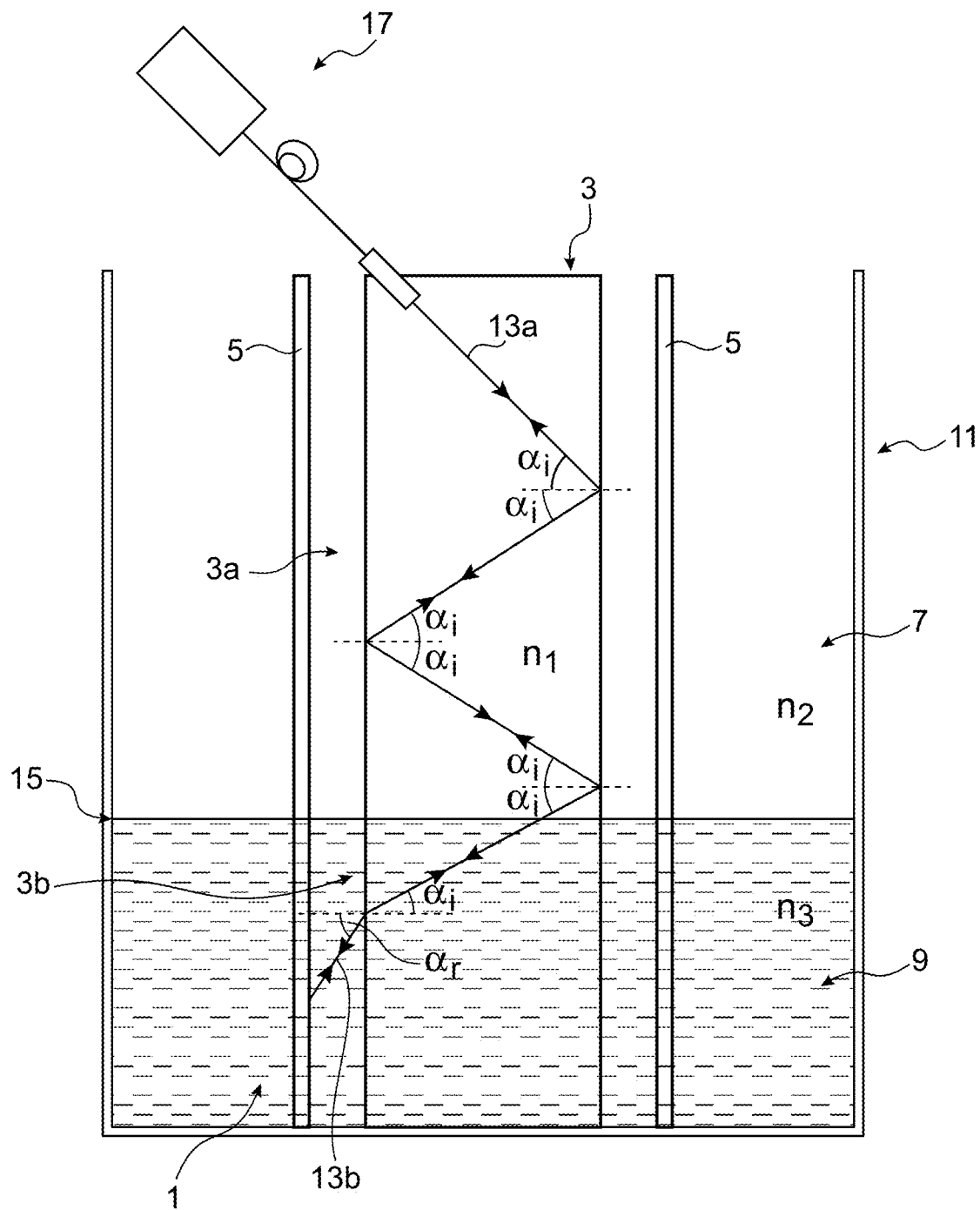
FIG. 1 illustrates, highly schematically, an optical probe suitable for measuring the level of a liquid in a tank, according to an embodiment of the invention.

In accordance with the invention, FIG. 1 schematically illustrates an optical probe suitable for measuring the level of the liquid in a tank, according to an embodiment of the invention.

The optical probe 1 comprises an optical waveguide 3 and reflecting surfaces 5. The optical waveguide 3 is transparent and made of a refractive polycarbonate, PMMA, glass type material, etc. having, for example, a refractive index $n_1$ of approximately 1.5.

It should be noted that the main optical feature that can be exploited in media for propagating a light beam is the refractive index. Thus, three environments with different indices are taken into account, in order to size and configure the optical probe 1. In addition to the refractive index $n_1$ of the optical waveguide 3, the refractive index $n_2$ of a gaseous medium 7 (air or air loaded with different gases enriched to a greater or lesser degree by vapours of a liquid) is also considered, as well as the refractive index $n_3$ of the liquid medium 9.

Thus, when the optical waveguide 3 is arranged in a tank 11 intended to contain the liquid 9, one part 3a of the optical waveguide 3 can be in contact with gaseous medium 7 above the liquid 9 while the other part 3b is immersed in the liquid 9.

The optical waveguide 3 is configured to receive an injection of a collimated light beam 13a and to internally reflect the collimated light beam 13a according to a total reflection regime in any part 3a of the waveguide 3 located in the gaseous medium 7, and to refract the collimated light beam 13a according to a refraction regime in any part 3b of the optical waveguide 3 immersed in the liquid medium 9.

In a general way, a collimated light beam changes orientation or direction on crossing the interface between a refracting medium such as that of the optical waveguide 3 of refractive index $n_1$ and a gaseous medium 7 of refractive index $n_2$. This change of direction is expressed by Snell's law which gives the relation between the angle of incidence $\alpha_1$ of the incident light beam, the angle of refraction $\alpha_2$ of the refracted light beam and the two refractive indices $n_1$ and $n_2$ of the two media either side of the interface, as follows: $n_1 \sin \alpha_1 = n_2 \sin \alpha_2$.

This law is valid up to a critical angle of incidence $\alpha_1 = \alpha_L$ which induces a grazing angle of refraction that is equal to 90° with respect to the normal of the plane of the interface. Beyond this critical angle of incidence $\alpha_L$, refraction is no longer observed, but rather a total internal reflection in the medium of the optical waveguide 3. In this case, for an angle of incidence $\alpha_i > \alpha_L$, the angle of reflection is also equal to the angle of incidence $\alpha_i$ and this is in a regime of total internal reflection within the optical waveguide 3. Thus, the optical waveguide 3 is configured to receive an injection of a collimated light beam 13 having an angle of incidence $\alpha_i$ greater than the limiting angle $\alpha_L$. The part 3b of the optical waveguide 3 in contact with the gaseous medium 7 remains, consequently, in a total reflection regime.

The conditions of total reflection can suddenly switch to a conventional refraction regime if the optical waveguide 3 is bathed in the liquid medium 9 of refractive index $n_3$.

Hence, the mode of operation of the optical waveguide 3 is capable of switching from the total reflection regime to the refraction regime at the interface 15 between the gaseous medium 7 and the liquid medium 9. Once the medium outside the optical waveguide 3 is the liquid medium 9, the collimated light beam 13a having an angle of incidence $\alpha_i$ is deflected and exits the optical waveguide 3 (light beam 13b) at an angle of refraction $\alpha_r$ in compliance with Snell's law: $n_1 \sin \alpha_i = n_3 \sin \alpha_r$.

In addition, the reflecting surfaces 5 (termed mirrors) are arranged around the optical light guide 3. These mirrors 5 are suitable for reversing the path of a collimated light beam 13b refracted by the optical waveguide 3 at the interface 15 between the gaseous medium 7 and the liquid medium 9. Indeed, the collimated light beam 13b refracted in the liquid medium 9 is redirected by the mirror effect in order to travel the incident optical path in the reverse direction, according to the optical law of the reverse path of the light. Thus, the optical path travelled by the light beam 13a-13b is representative of the level of the liquid in the tank 11.

Advantageously, a telemetry tool 17 is used, which is suitable for injecting the light pulse (i.e. the collimated light beam) 13a into the optical waveguide 3 and for receiving, in return, the light beam reversed by the mirror effect. By measuring the time elapsed between the emission of the light beam and reception of the reversed light beam, the telemetry tool 17 determines the optical length travelled. Knowing the total height of the tank 11, the telemetry tool 17 determines the height of the liquid 9 in the tank 11.

Figure 2:
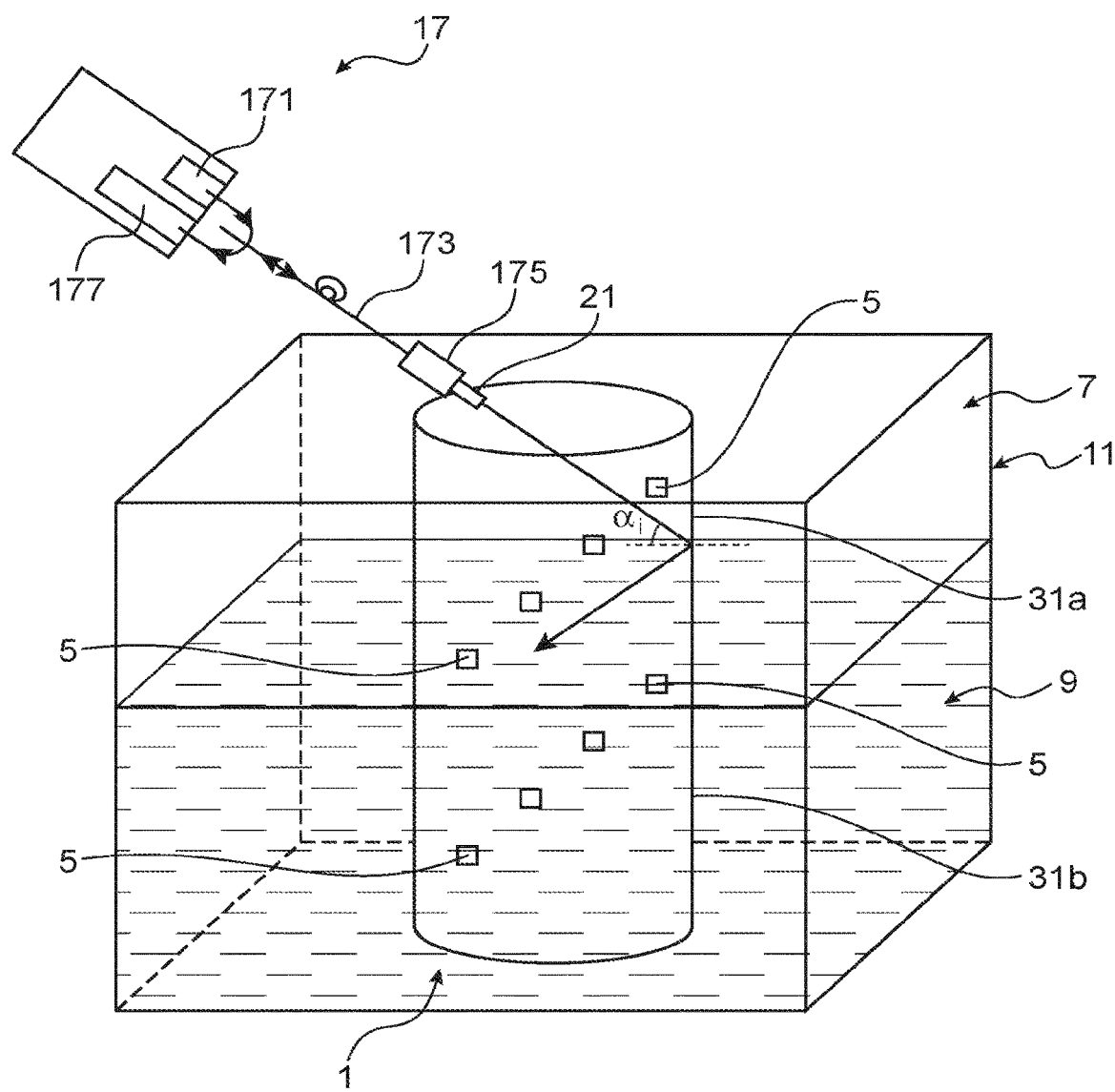
FIG. 2 schematically illustrates an optical probe suitable for measuring the level of the liquid in a tank, according to a preferred embodiment of the invention.

FIG. 2 schematically illustrates an optical probe suitable for measuring the level of a liquid in a tank, according to a preferred embodiment of the invention.

According to this embodiment, the optical waveguide 3 is a solid optical cylinder 31 made of a transparent and refractive material. The cylinder illustrated in FIG. 2 is a right circular cylinder. Alternatively, the optical cylinder 31 can be a right cylinder with prismatic surface (i.e. a right prism with flat surfaces).

The optical cylinder 31 comprises a receiving region 21 suitable for receiving the injection of the light beam 13a at a predetermined angle of incidence $\alpha_i$. The value of this angle of incidence $\alpha_i$ is chosen to be greater than the critical angle of incidence $\alpha_L$. In particular, it is determined as a function of the refractive indices $n_1$, $n_2$ and $n_3$ of the optical cylinder 31, the gaseous medium 7 and the liquid medium 9 respectively, so that a total reflection regime is established in the part 31a of the optical cylinder 31 in contact with the gaseous medium 7 and which switches to a refraction regime following the first contact of the optical cylinder 31 with the liquid medium 9.

By way of example, in order to measure the level of kerosene in a tank 11, the value of the angle of incidence $\alpha_i$, which is also the angle of total reflection, is approximately 60°. More precisely, the value of the angle of incidence $\alpha_i$ is (60.27)° for an optical cylinder 31 having a refractive index $n_1$ of approximately 1.5 immersed in a tank 11 containing a liquid medium consisting of kerosene with refractive index $n_3$ of approximately 1.44 and a gas space consisting of air contaminated with fuel vapours and with refractive index $n_2$ of approximately 1. An optimum angle of incidence $\alpha_i$ is therefore imposed in order to benefit from a reflection regime in the gaseous medium 7 and a refractive regime in the liquid medium 9.

The light source (laser source) 171 of the telemetry tool 17 is connected to the receiving region 21 of the optical cylinder 31 by means of an optical fibre 173 and a collimator 175. The connection between the collimator 175 and the receiving region 21 is locked so that the angle of incidents $\alpha_i$ is constant with no variation. By way of example, the receiving region 21 comprises a connector is the form of a sloping channel representative of the angle of incidence and which is suitable for being firmly connected to the collimator 175. Thus, the laser source 171 of the telemetry tool 17 injects a light beam 13a into the cylinder 31, at a predetermined and invariant angle of incidence $\alpha_i$.

Figure 3A:
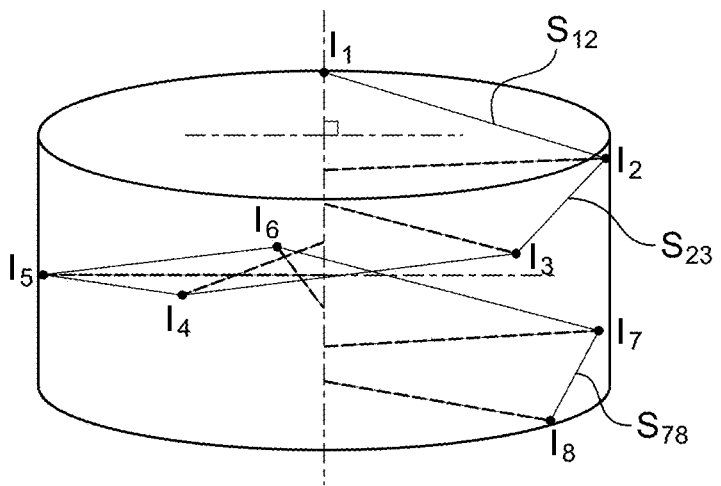
FIGS. 3A-3C schematically illustrate the optical path followed by the light being injected by a telemetry tool, according to the embodiment of FIG. 2.
Figure 3B:
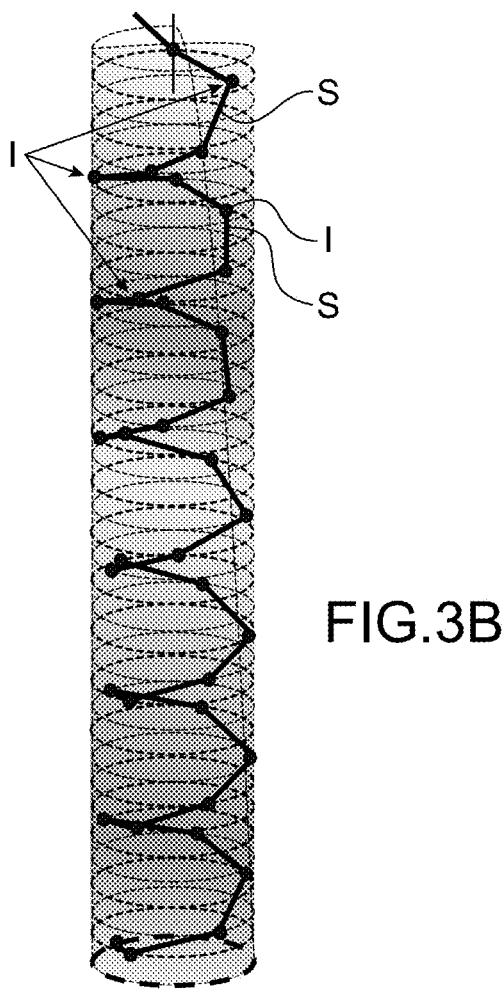
Figure 3C:
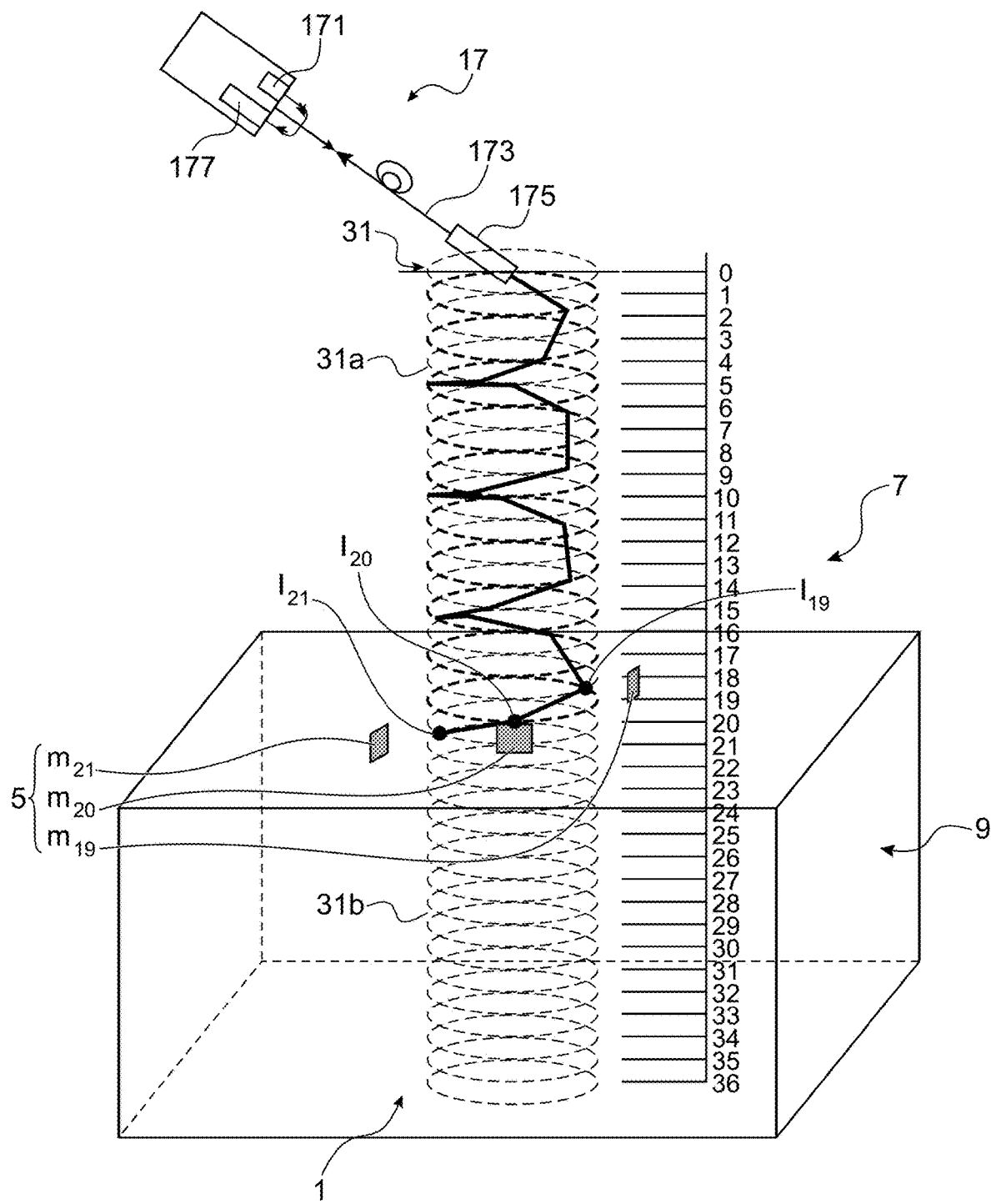

FIGS. 3A-3C schematically illustrate the optical path followed by the light beam injected by the telemetry tool, according to the embodiment of FIG. 2.

FIGS. 3A and 3B illustrate the path for the collimated light beam 13a in a total reflection regime corresponding to the case where the optical cylinder 31 or a part of the cylinder is in the gaseous medium 7.

The angle of incidence $\alpha_i$ is configured so that in the total reflection regime, the light beam 13a can travel on the inside of the optical cylinder 31 along a pseudo-helical path formed by a series of straight segments (s) the ends of which are points of incidence or impact l of the light beam 13a on the walls of the optical cylinder 31 at the predetermined angle of incidence $\alpha_i$. FIG. 3A illustrates eight points of impact $l_1$-$l_8$ defining segments $s_{12}$-$s_{78}$ of the same length. Thus, for a predetermined angle of incidence $\alpha_i$ and a predetermined diameter of the optical cylinder 31, the points of impact I are determined with precision. By way of example, for an optical cylinder 31 having a diameter of 45 mm, the pitch (i.e. the height) between two consecutive points of impact l is 15 mm.

FIG. 3C illustrates the path of the light beam in an optical cylinder 31 partially immersed in the liquid medium 9, illustrating the switching between the total reflection regime and the refraction regime.

Each point of impact l forms a type of window through which the collimated light beam exits the optical cylinder 31 by refraction when the window is in the part 31b of the optical cylinder 31 immersed in the liquid 9. It should be noted that, in the following, the terms "window" and "point of impact" are designated by the same symbol l since the two terms are equivalent in the present invention.

Indeed, the angle of incidence $\alpha_i$ is configured so that the light beam can exit from the optical cylinder 31 by refraction once the point of impact or window l is located in the part 31b immersed in the liquid medium 9. The example of FIG. 3C shows that the points of impact (or windows) $l_1$ to $l_{20}$ are not immersed while the window $l_{21}$ corresponds to the first immersed point of impact. Thus, the collimated light beam is deflected at the window $l_{21}$.

Advantageously, the reflecting mirrors 5 (only three mirrors $m_{19}$, $m_{20}$ and $m_{21}$ are illustrated) are attached to the optical cylinder 31 and are arranged facing the points of impact l (i.e. facing the windows l). Thus, the mirrors 5 are integral with the optical cylinder 31 and each window l is associated with a reflecting mirror 5 which faces it, in order to form a window-mirror pair. The clearance between a mirror 5 and its window l is of the order of several mm (for example, approximately 5 mm). Thus, the space between the point of impact l and the associated mirror can be occupied by a liquid or gaseous medium.

The window-mirror pairs $l_{19}$-$m_{19}$ and $l_{20}$-$m_{20}$ are not immersed, whereas the window-mirror pair $l_{21}$-$m_{21}$ is the first immersed pair. Thus, the light beam which exits from the window $l_{21}$ is reflected by the mirror $m_{21}$ associated with this window $l_{21}$. The light beam is reflected towards the telemetry tool 17 by travelling, in the reverse direction, the entire optical path which it travelled to the window $l_{21}$.

The telemetry tool 17 receives the collimated light reversed by the mirror $m_{21}$ and measures the time elapsed between the emitting of the light beam and the receiving of the reversed light beam.

Let K be the length of the optical fibre 173 and collimator 175 and let H(z) be the height of the tank 11 in the direction of gravity. In addition, let $\Delta(z)$ be the height between two consecutive windows 1 of the optical cylinder and c be the length of the segment s (or chord) between two consecutive impacts (i.e. windows) l. The values K, H(z), $\Delta(z)$ and c are constant for a given optical probe 1 and a given tank 11. Let L be the total length of the path of the light beam from the laser source 171 of the telemetry tool 17. The total length of the path L corresponds to the sum of the length of the optical fibre K and of the optical path d travelled by the light beam in the optical cylinder 31 (i.e. L=K+d) and this is the value L which is measured by the telemetry tool 17.

Advantageously, the telemetry tool 17 comprises an analyser 177 which determines the total length of the path L of the light beam as a function of the time elapsed between emitting the light beam and receiving the reversed light beam. The analyser 177 then determines the level h(z) of the liquid 9 in the tank 11 according to the following formula:

$$h(z) = H(z) + \frac{(K-L)\Delta(z)}{c}$$

The measurement accuracy depends on the height $\Delta(z)$ between two windows l. By way of example, for an optical cylinder 31 with diameter of 45 mm and a height $\Delta(z)$ between two consecutive windows 1 of order 15 mm, a sufficiently high accuracy is obtained in order to measure the level of the liquid 9 in a tank 11. It should be noted that in an aircraft, the height H(z) of a tank 11 is of order 1500 mm, thus requiring an optical cylinder 31 having around one hundred points of impact l. Knowing the position of the optical cylinder 31 with respect to the reference of the bottom of the tank 11, the empty height H(z) of the tank 11 can of course be measured by the optical probe 17.

According to another embodiment (not illustrated), the optical waveguide 3 (or optical cylinder 31) can be suitable for receiving a plurality of light beam injections. By way of example, the optical cylinder 31 can comprise two or three receiving regions connected to two or three collimators generating three channels of optical paths allowing the accuracy of the measurements to be advantageously increased and/or reducing the number of windows. Advantageously, a single telemetry tool is sufficient, which can be configured to transmit and receive a plurality of light signals according to a predetermined pulsing sequence.

Figure 4:
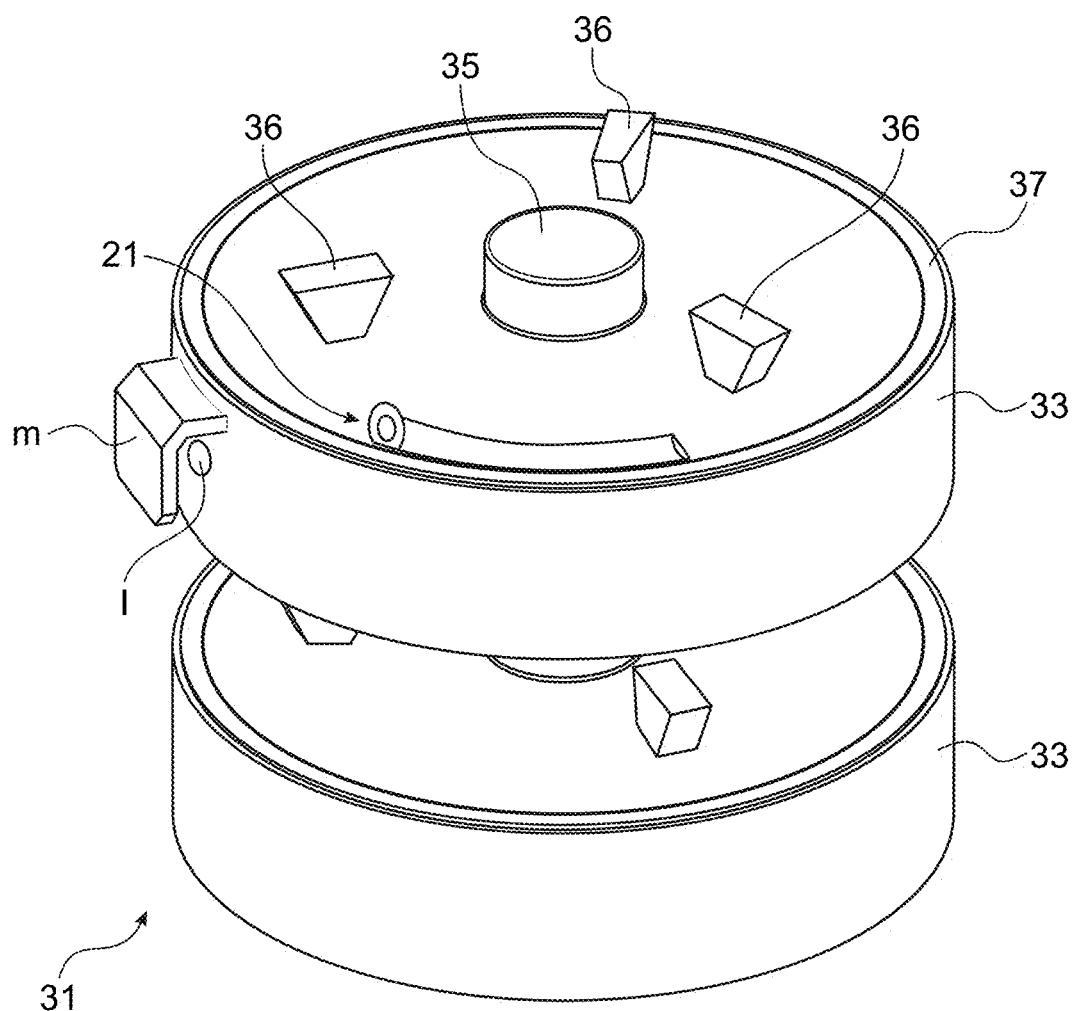
FIG. 4 schematically illustrates cylindrical elements for the construction of a modular optical probe, according to a preferred embodiment of the invention.

FIG. 4 schematically illustrates cylindrical elements for the construction of a modular optical probe, according to a preferred embodiment of the invention.

According to this embodiment, the optical cylinder 31 is formed of a set of modular cylindrical solid elements 33 each corresponding to a stage of the optical cylinder 31 comprising a window-mirror pair l-m. The modular elements 31 are configured in order to stack firmly one above the other according to a snap-fastening, ratcheting or other type of assembly.

Each modular cylindrical element 33 also comprises a mirror m, adjustment means and male and female snap fastenings 36 (only the male snap-fastening means are illustrated). The mirror m is rigidly attached to the side wall of the cylindrical modular element 33 and is separated from the latter by a distance of approximately 5 mm. The male snap-fastening means 35, 36 of a cylindrical modular element 33 are adapted for firmly snap fastening in the female snap-fastening means of another cylindrical modular element in various configurations. Thus, the locations of the mirrors m of the various modular elements matches the locations of the points of impact l of a light beam travelling a pseudo-helical path.

Each cylindrical modular element 33 comprises, on its upper side, a central protrusion 35 in the form of a stud and a predetermined number of auxiliary studs 36 regularly distributed circumferentially about the central protrusion 35. The cylindrical modular element comprises, on its lower side (not illustrated), a central cavity and a predetermined number of auxiliary cavities regularly distributed circumferentially about the central cavity. The protrusions 35, 36 of one cylindrical modular element 33 fit and resiliently snap fasten in the cavities of another cylindrical modular element 33.

The example of FIG. 4 illustrates three auxiliary protrusions 36 regularly distributed about the central protrusion 35. This configuration makes it possible to vary the orientation about the cylindrical axis of a cylindrical module 33 with respect to its neighbour at a polar angle that is a multiple of 135°. Of course, the configuration can be changed by varying the number of auxiliary protrusions.

In addition, each modular element 33 comprises a sealing gasket 37 enabling a hermetic and sealed snap fitting between the various modules 33.

It should be noted that the cylindrical modular element 33 intended to be connected to the optical fibre and to the telemetry tool 17 comprises a receiving region 21 in the form of a channel sloping at the predetermined angle of incidence. Advantageously, only the modular element which must be connected to the telemetry tool, comprises the receiving region for the collimation of the beam.

The optical probe can be used to measure the level of any liquid (fuel, water, etc.) in a tank and, more particularly, is very suitable for measuring the level of kerosene in an aircraft tank due to its high precision and the total absence of safety risks.

Indeed, the optical probe is entirely passive, requiring no electrical power cabling. It is not subject to problems of electromagnetic compatibility EMC and generates no heat. It requires no integrated electronics and no integrated software. The optical probe can be constructed in a modular manner requiring just one reference number P/N and being easily adapted to tanks of different heights and, in particular, to different levels in the wings of aircraft. Moreover, its accuracy is optimal and does not vary over time while being very robust.

The invention claimed is:

1. An optical probe suitable for measuring the level of a liquid in a tank, comprising:
   a transparent and refracting optical waveguide suitable for receiving an injection of a collimated light beam at a predetermined angle of incidence, said optical waveguide being configured to internally reflect the collimated light beam according to a total reflection regime in any part of the optical waveguide located in a gaseous medium and to refract the collimated light beam according to a refraction regime in any part of the optical waveguide immersed in a liquid medium, said optical waveguide being capable of switching from the total reflection regime to the refraction regime at the interface between the gaseous medium and the liquid medium;
   mirrors arranged around said optical waveguide and suitable for reversing the path of a collimated light beam refracted by the optical waveguide at the interface between the gaseous medium and the liquid medium; and
   a telemetry tool suitable for injecting the light beam in the form of a light pulse into said optical waveguide and for receiving in return the collimated and reversed light beam making it possible to measure the length of the optical path travelled by the light beam and to deduce therefrom the level of the liquid in the tank.

2. The optical probe according to claim 1, wherein the optical waveguide is a solid optical cylinder made of refractive material, said optical cylinder comprises a receiving region suitable for receiving the injection of the collimated light beam at a predetermined angle of incidence, said angle of incidence being configured so that, in the total reflection regime, the collimated light beam can travel a path consisting of a series of straight segments the ends of which are points of impact of the light beam on the walls of the optical cylinder at said predetermined angle of incidence, said mirrors are attached to the optical cylinder and are arranged facing the points of impact, termed windows.

3. The optical probe according to claim 1, the optical waveguide being a right circular cylinder.

4. The optical probe according to claim 1, the optical waveguide being a right optical cylinder with prismatic surface.

5. The optical probe according to claim 1, wherein said optical waveguide is suitable for receiving a plurality of light-beam injections.

6. The optical probe according to claim 1, wherein the optical cylinder is formed of a set of modular elements which are configured to be stacked firmly on one another.

7. The optical probe according to claim 6, wherein each modular element comprises a mirror and male and female snap-fitting means suitable for ensuring snap-fitting in various configurations.

8. The optical probe according to claim 1, wherein the value of the angle of incidence is determined according to the refractive indices of said optical cylinder, said gaseous medium and said liquid medium.

9. The optical probe according to claim 8, wherein the optical cylinder has a refractive index of 1.5, the gaseous medium is air with a refractive index of 1, the liquid medium is kerosene with a refractive index of 1.44 and the value of the angle of incidence is 60°.

* * * * *